United States Patent [19]

Cathriner et al.

[11] Patent Number: 4,708,793
[45] Date of Patent: Nov. 24, 1987

[54] SYSTEM FOR SEPARATING GAS-LIQUID FLOWSTREAMS

[75] Inventors: Richard L. Cathriner, Plano, Tex.; Thomas R. Roose, Downers Grove, Ill.

[73] Assignee: Atlantic Richfield Company, Los Angeles, Calif.

[21] Appl. No.: 874,258

[22] Filed: Jun. 13, 1986

[51] Int. Cl.$^4$ .............................................. B01D 19/00
[52] U.S. Cl. ..................................... 210/188; 55/202; 55/206; 210/539
[58] Field of Search ................... 55/36, 342, 343, 159, 55/199, 201, 202, 206, 188; 210/664, 218, 767, 800, 806, 120, 539, 538, 541, 542

[56] References Cited

U.S. PATENT DOCUMENTS 2,874,798  2/1959  Walker ................................. 55/202

FOREIGN PATENT DOCUMENTS 18803   9/1887  Fed. Rep. of Germany ........ 55/206
313201 12/1915  Fed. Rep. of Germany ........ 55/206

*Primary Examiner*—Frank Sever
*Attorney, Agent, or Firm*—Michael E. Martin

[57] ABSTRACT

Apparatus for separating slugs of fluid of one phase flowing through a conduit which is conducting fluid of another phase comprising an elongated inlet manifold connected to an inlet conduit at one end and being of sufficient cross-sectional flow area to reform the fluid flow from the inlet conduit into substantially channel flow for the liquid entering the inlet manifold. A liquid discharge manifold is located below the inlet manifold and is connected to the inlet manifold by a plurality of downcomer conduits which are spaced apart one from the other along the length of the inlet manifold. A gas discharge conduit is connected to the downstream end of the inlet manifold and to a gas-liquid separator for demisting the gas discharged from the inlet manifold. Gas blow-by through the discharge manifold is prevented by a liquid trap formed by a liquid discharge conduit connected to the liquid discharge manifold. Flow is controlled through the system to permit substantial dampening or elimination of slugs of gas in liquid or liquid in gas such as encountered in oil and gas well production operations and other two-phase fluid flow systems.

10 Claims, 2 Drawing Figures

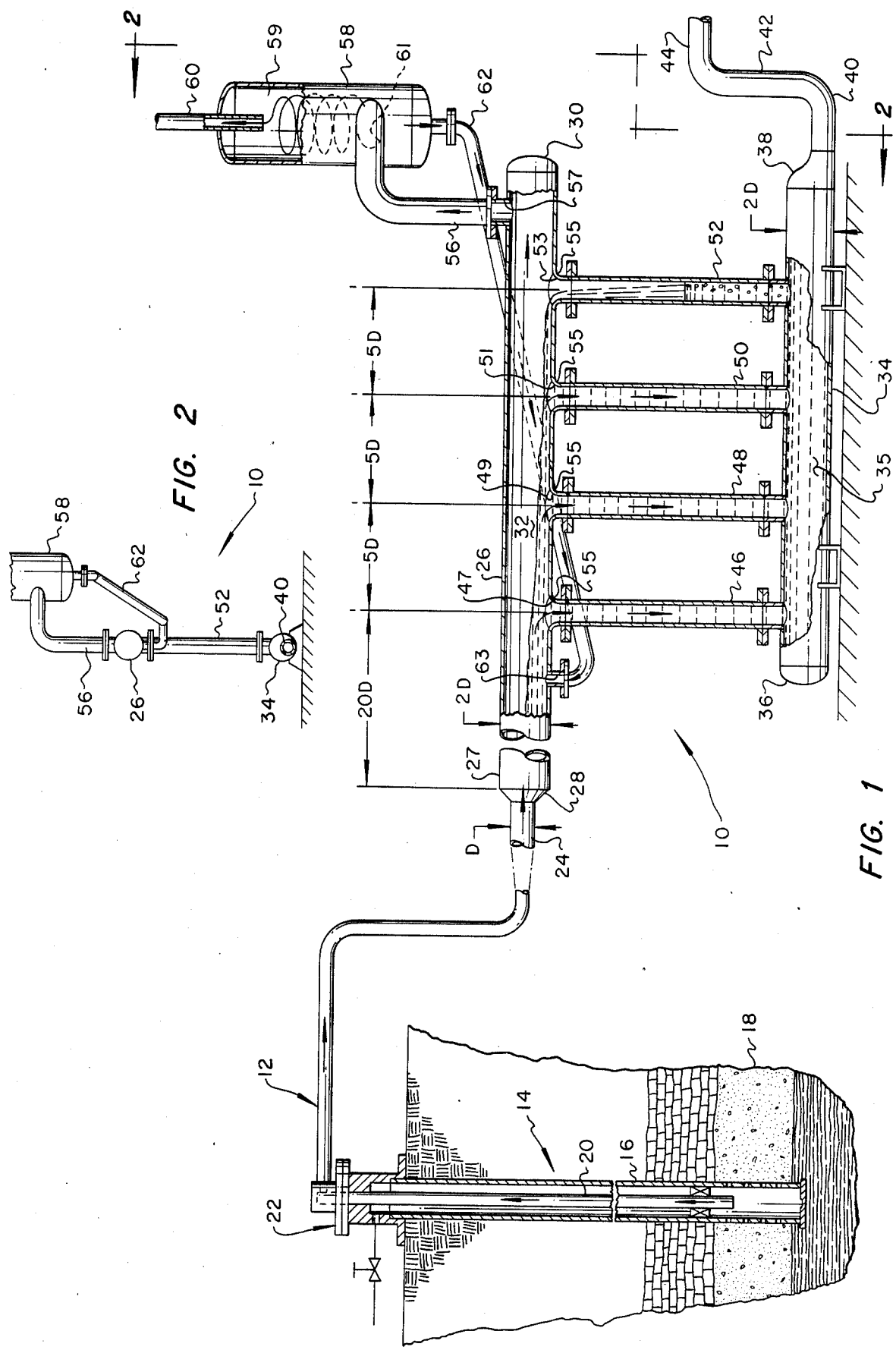

SYSTEM FOR SEPARATING GAS-LIQUID FLOWSTREAMS

BACKGROUND OF THE INVENTION

1. Field of the Invention

The present invention pertains to a system for eliminating slug flow in gas-liquid flow streams by converting two-phase flow into separate and uniform liquid flow and gas flow prior to conducting further processes.

2. Background

In many fluid handling and fluid treatment processes two phase, that is gas and liquid, flow must be dealt with prior to treatment of one fluid or the other. In the production of oil and gas from subterranean formations, for example, gas-liquid separation systems must often be designed for accomodating periodic slugs of liquid in a flow stream which comprises both liquid and gas. In oil and gas production, separation systems which provide for separation of quantities of gas from a liquid must often be designed to handle relatively large slugs or bubbles of one fluid in the other. This provision dictates unnecessarily large, complicated and expensive separation equipment just to handle periodic slugs of fluid or substantial changes in the ratio of one fluid to the other. Devices known as "slug catchers" must often be provided in oil and gas well gathering and processing systems at substantial extra cost of the systems. Other fluid processing systems wherein slug flow of one fluid in another is unwanted include gas processing plants and systems utilizing turboexpanders and other rotary gas expansion machines.

In view of the foregoing problems in handling two-phase flow from oil and gas wells, as well as other two-phase fluid flow streams, there has been a longfelt need for an effective and uncomplicated separation system which can be interposed between a source of somewhat uncontrolled two-phase flow and conventional phase separation equipment to eliminate the need for complex and oversized separation apparatus. In this regard, the present invention has been developed and is based at least in part on effectively utilizing observed wall attachment phenomena regarding liquid flow which assists in separating gas-liquid slugs, and by taking advantage of the separation characteristics of converting full diameter conduit flow to channel flow in an enlarged manifold, for example. The system has been developed with a view to providing an uncomplicated separation apparatus which reduces or eliminates the tendency for slug flow in a combined gas and liquid flow stream which is being treated for further separation of gas or separation of one liquid from another.

SUMMARY OF THE INVENTION

The present invention provides a unique fluid separator system and apparatus for eliminating so-called slugs of a fluid of one phase in a flow stream of a fluid of another phase to reduce the capacity requirements of or eliminate the need for conventional two-phase separation equipment.

In accordance with an important aspect of the present invention, there is provided an apparatus which converts slug flow in a closed conduit into so-called channel flow in an enlarged conduit or manifold arrangement to separate slugs of fluid of one phase from a flow stream of a fluid of another phase. The apparatus provides means whereby a liquid flow stream is directed into a plurality of generally vertically extending conduits between an inlet manifold and a liquid discharge manifold to assist in the flow separation phenomena provided by wall attachment flow of liquid.

In accordance with another important aspect of the present invention, there is provided a gas-liquid separator system which is mechanically uncomplicated and is particularly adapted to be interposed in a two-phase liquid conduit system for separating slugs or batches of liquid mixed with a gas, or vice versa, so that essentially slug-free flow streams of both gas and liquid may be conducted to further separation processes or utilized as required free of slugs of fluid of the other phase.

The present invention is particularly adapted for separating gas-liquid flow streams from wells producing hydrocarbon fluids wherein the two-phase slug flow produced by such wells is introduced into an elongated inlet manifold or conduit so that the flow stream reforms as channel type flow. Production liquid is discharged through generally vertically extending downcomer conduits into a second manifold. Gas is discharged from the inlet manifold into a centrifugal type separator and liquid separated from the gas is returned to the channel flow manifold for reintroduction into the liquid flow stream.

The separation system may be fabricated utilizing conventional pressure vessel and conduit manufacturing techniques. The utilization of the separation system of the present invention provides for a significant reduction in the physical size of conventional separation equipment, eliminates the need for utilizing fluid slug catchers in fluid flow systems, provides better flow control in fluid systems subject to two-phase flow and is particularly advantageously used in the production, distribution and processing of hydrocarbon fluids at remote or relatively inaccessible production facilities, in particular. Those skilled in the art will recognize these advantages and features of the present invention as well as additional superior aspects thereof upon reading the detailed description which follows in conjunction with the drawing.

BRIEF DESCRIPTION OF THE DRAWING

FIG. 1 is a diagram including a side elevation, partially sectioned, of the separation system of the present invention; and FIG. 2 is an end view of the separation system taken generally from Line 2—2 in FIG. 1.

DESCRIPTION OF A PREFERRED EMBODIMENT

In the description which follows like parts are marked throughout the specification and drawing with the same reference numerals, respectively. The drawing figures are not necessarily to scale and certain features of the invention may be shown exaggerated in scale or in somewhat schematic form in the interest of clarity and conciseness.

Referring to FIG. 1, in particular, there is illustrated a two-phase flow separation system in accordance with the present invention and generally designated by the numeral 10. The separation system 10 is shown connected by way of a conduit 12 to a well 14 for producing hydrocarbon fluids which may consist of crude oil, water and gas, all flowing into the well through a perforated casing 16 from a subterranean formation 18. The well 14 may be primarily an oil well or a gas well and, depending on the particular geological formation into which the well has been drilled, a wide variety of ratios of gas to liquid fluids produced from the formation 18 may be experienced at various times during production operations. Pumping apparatus such as gas lift equipment, for example, for lifting fluids through production tubing 20 is not shown in the schematic diagram of the well 14 but the tubing is suitably connected to the conduit 12 at a conventional wellhead 22.

In conventional production operations, equipment for separating water from the crude oil, for example, not shown in the drawing figures must be sized to accommodate occasional slugs of gas which may be produced from the formation 18 also. Since the oil-water separating equipment is relatively expensive to construct, the unnecessarily large sizing of this equipment just to accommodate occasional slugs of gas is expensive and unwanted. By the same token, if the well 14 is primarily a gas well, the provision of separation equipment and the sizing of gas processing equipment to accommodate occasional slugs of water or condensate is unwanted. Accordingly, there has been a need to develop a relatively inexpensive preseparation system such as the system 10 for separating slugs of liquid in gas or gas in liquid so that both phases of fluids produced from the well 14, for example, may be further treated as required.

The system or apparatus 10 is characterized by an inlet conduit portion 24 which may be formed of conventional steel pipe and having a diameter D which may be of the same diameter as the supply conduit 12. Alternatively, the conduit 24 may be suitably connected to a plurality of wells through several connecting conduits, not shown. The conduit 24 is connected to an elongated generally cylindrical manifold member 26 of a nominal diameter preferably at least two times the diameter D of the conduit 24 which is supplying the two-phase fluid flow to the apparatus 10. The manifold member 26 is connected to the conduit 24 through a reducer member 28 and includes a suitable closure or head 30 at its opposite end. The manifold member 26 defines an interior flow chamber 32 which is typically of cylindrical cross-sectional shape. An inlet portion 27 of the manifold member 26 is defined as a portion approximately fifteen to twenty times the diameter D of the inlet conduit 24 and comprises that portion of the manifold which permits reforming of the full conduit flow of fluid through the conduit 24 into channel flow. Flow is controlled so that normally it is at a rate such that the depth of liquid in the chamber 32 is normally approximately no more than one-half the diameter of the manifold member 26 in the inlet portion 27 to leave a gas flow space in the upper portion of the chamber 32.

The apparatus 10 also comprises a liquid discharge manifold 34 which is also characterized as an elongated cylindrical member having a diameter approximately the same as the diameter of the manifold member 26. The liquid discharge manifold 34 forms an interior chamber 35 delimited by a closure head 36 at its upstream end and an eccentric reducer portion 38 formed at its downstream end and which is connected to a liquid discharge conduit 40. The liquid discharge conduit 40 preferably includes a vertical riser section 42 and a generally horizontal final discharge portion 44. The arrangement of the eccentric reducer section 38 leading to the discharge conduit 40 and the vertical riser section 42 of the discharge conduit provides a trap which substantially prevents the blow-by or flow of gas from the chamber 35 into the final discharge conduit 44. The manifolds 26 and 34 are interconnected by a plurality of generally vertically extending downcomer conduits 46, 48, 50 and 52. The conduits 46, 48, 50 and 52 are shown four in total number and, depending on the flow conditions, more or less may be required. The downcomer conduits 46, 48, 50 and 52 are of approximately the same diameter as the diameter D of the inlet conduit 24. In a preferred arrangement of the apparatus 10 the conduits 46, 48, 50 and 52 are spaced apart seriatim along the manifold member 26 and open into the chamber 32 at the lower portion thereof at distances between their respective longitudinal centerlines approximately five times the diameter D of the conduit 24. The length of the inlet portion 27 of the manifold member 26 is preferably measured between the centerline of the first downcomer conduit 46 and the full diameter portion of the manifold 26 where it is connected to the reducer section 28. The distances determining the length of the inlet portion 27 and the distances between the conduits 46, 48, 50 and 52 are approximate and are believed to provide for the most effective separation of liquid and gas flows entering the chamber 32. Although the conduits 46, 48, 50, and 52 are preferably vertically extending, the apparatus 10 may be modified such that these conduits extend at some other angle from the manifold 26 to the manifold 34.

The apparatus 10 is configured to provide for fluid flow rates through the apparatus in such a way that the conduits 46, 48, 50 and 52 will accept all of the liquid flow and in such a way that the conduit 52 receives less than a full cross-sectional flow stream of liquid entering the conduit 52 at its inlet opening 53. The conduits 46, 48, and 50 have respective inlet openings 47, 49, and 51, which typically may receive a somewhat solid or full cross-sectional flow stream of liquid from which any gas bubbles or slugs have already substantially separated. However, any minor amounts of entrapped gas flowing down through the conduits 46, 48, and 50 and entering the chamber 35 of the discharge manifold 34 may be allowed to escape up through the conduit 52 and into the chamber 32 to prevent re-entraining of gases in the liquid leaving the manifold 34 through the conduit 44. The tendency for liquid flow to adhere to the bottom of the channel formed by the manifold member 26 and to the side walls of the conduits 46, 48, 50 and 52 also promotes separation of gas from the flow stream. This flow behavior is favorable for providing for upward flow of gas at least in conduit 52 where full cross-sectional liquid flow in conduit 52 is not expected. The intersections of the downcomer conduits 46, 48, 50, and 52 with the manifold 26 are provided by suitable fittings 55 which are configured to form a curved surface defining the openings 47, 49, 51, and 53. In this way the wall attachment phenomena experienced by the liquid flowing into the conduits 46, 48, 50 and 52 is enhanced and a swirling or vortical type liquid flow due to Coriolis forces promotes gas-liquid separation.

The apparatus 10 further advantageously includes a demister and/or centrifugal type separator for separating any liquid entrained with the gas flowing through the chamber 32 and through a gas outlet conduit 56. The outlet conduit 56 is disposed adjacent the discharge closure head 30 and opens into the chamber 32 at an opening 57. The gas discharge conduit 56 also opens into a centrifugal demister or separator 58 comprising a generally cylindrical vessel having a central gas discharge conduit 60 opening through the top thereof into a chamber 59. The gas discharge conduit 56 opens tangentially into the chamber 59 at an inlet opening 61 to impart a centrifugal or swirling motion to the gas and any liquid mist entering the chamber 59. Any liquid collected in the chamber 59 flows back to the manifold 26 through a liquid return conduit 62 and preferably opens into the manifold inlet portion 27 through a bottom liquid inlet opening 63.

In addition to the proportions of certain components of the apparatus 10 described hereinabove, in a preferred embodiment of the apparatus, the nominal diameter of the gas discharge conduit 56 would be approximately the same as diameter D of the inlet conduit 24, and the liquid return conduit 62 may be approximately one-half the diameter of the conduit 56. The nominal diameter of the gas separator vessel 58 could be approximately three times the diameter D of the conduit 56 and the final dry gas discharge conduit 60 might also preferably be of the same diameter as the conduit 56 to minimize pressure losses of the gas flowing through the apparatus 10. FIG. 1 illustrates that the conduits 46, 48, 50 and 52, as well as the conduits 56 and 62, may be interconnected with the respective vessels or manifolds by conventional bolt type flanges as indicated. The apparatus 10 may be constructed in accordance with conventional pressure vessel fabricating techniques, has no moving parts or elements and has no components which require periodic replacement or regeneration.

In the operation of the system or apparatus 10, the inlet conduit 24 is connected to a source of two-phase fluid flow, which may be the well 14 or other sources of two-phase flow which typically include slugs of one phase entrained in a flow stream which may be primarily another phase. The flow rate into the apparatus 10 is adjusted so that essentially all of the liquid entering the chamber 32 and reforming into channel flow may be handled by the downcomer conduits 46, 48, 50 and 52, so that flow into the chamber 35 of the discharge manifold 34 is essentially gas free. However, as described above, the flow rate is adjusted so that liquid flowing into the fourth or last downcomer conduit 52 in the direction of flow of fluid through the manifold 26 is reduced to a rate such that any gas entrained with the liquid flowing into the manifold 34 flow up through the conduit 52 in reverse direction to the flow of liquid to prevent any accumulation of gas in the liquid flowing to the liquid discharge conduit 44. The trap formed by the vertically extending discharge conduit 42 which extends above the top of the manifold 34, substantially prevents any gas blow-by through the apparatus 10 to the final liquid discharge conduit 44. Moreover, any liquid mist or droplets entrained with gas flowing from the chamber 32 into the demister or gas-mist separator 58 may be finally separated from the remaining gas flow and returned to the manifold 26 as essentially gas free liquid.

The structural simplicity of the apparatus 10, which takes advantage of the wall attachment phenomena associated with liquid flow streams substantially dampens or eliminates slug flow in two-phase fluid flow systems. Although the embodiment of the apparatus 10 described herein is preferred and the dimensional relationships given are believed to be optimum, those skilled in the art will recognize that other features may be added to the system or the basic configuration of the apparatus may be modified in detail without departing from the scope and spirit of the invention as recited in the appended claims.

What we claim is:

1. A system for separating liquid and gas in two-phase flow in a closed conduit wherein slugs of one fluid are entrained in a flow stream which is a fluid of another phase, said system comprising: means for converting slug flow into channel flow in a closed system including,
    a first elongated closed vessel forming an inlet manifold and having an inlet conduit for receiving two-phase fluid flow comprising slugs of fluid of one phase in a fluid of another phase, said manifold having an inlet portion with a cross-sectional flow area sufficient to reform slug flow of fluid from said inlet conduit into a channel flow condition in a chamber formed in said inlet manifold to provide a substantially unobstructed channel forming a liquid flow space along a lower portion of said inlet manifold and a gas flow space;
    a second elongated closed vessel forming a liquid discharge manifold disposed spaced apart from said inlet manifold and spaced vertically below said inlet manifold and connected to a liquid discharge conduit;
    a plurality of generally vertically extending downcomer conduits interconnecting said inlet manifold and said discharge manifold, said downcomer conduits being spaced apart one from the other along the liquid flow space of said inlet manifold and opening to said manifolds, respectively, for conducting liquid flow from said inlet manifold to said discharge manifold, said downcomer conduits opening into said inlet manifold along said lower portion thereof to direct the channel flow of liquid flowing through said inlet manifold into said downcomer conduits, said downcomer conduits being sufficient in number such that at a predetermined flow rate of fluid through said inlet manifold that substantially entirely liquid flow is conducted through a majority of said downcomer conduits to said discharge manifold; and
    a gas discharge conduit opening into said chamber of said inlet manifold for removing gas from said inlet manifold separated from said flow stream.

2. The system set forth in claim 1 wherein:
    said liquid discharge conduit includes a vertically extending portion extending above said discharge manifold to minimize the tendency of gas to flow from said inlet conduit to said liquid discharge conduit through said discharge manifold.

3. The system set forth in claim 1 including:
    a gas-liquid separator vessel disposed above said inlet manifold and connected to said gas discharge conduit for separating liquid entrained in gas flowing from said inlet manifold through said gas discharge conduit, and a liquid return line connected to said gas separator vessel and to said inlet manifold for returning liquid separated from said gas to said liquid flow stream.

4. The system set forth in claim 3 wherein:
    said liquid return line is connected to said inlet manifold at a point upstream of said downcomer conduits with respect to the direction of flow of fluid through said inlet manifold.

5. The system set forth in claim 1 wherein:
    the length of the inlet portion of said inlet manifold is in the range of at least fifteen to twenty times the diameter of said inlet conduit.

6. The system set forth in claim 5 wherein:

said inlet manifold is a cylindrical cross-section vessel having a diameter at least about twice the diameter of said inlet conduit.

7. The system set forth in claim 6 wherein:
said downcomer conduits are spaced apart one from the other along the length of said inlet manifold a distance from each other about five times the diameter of said inlet conduit.

8. The system set forth in claim 1 wherein:
said downcomer conduits intersect said inlet manifold at openings delimited by walls having curved surfaces so that liquid flowing into said downcomer conduits tends to adhere to said surfaces and to separate from gas entrained in said liquid.

9. A system for separating slugs of fluid of one phase from fluid of another phase flowing through a closed fluid inlet conduit, said system comprising: means for converting slug flow into channel flow in a closed system including,
an elongated closed inlet manifold forming a substantially unobstructed channel having a cross-sectional flow area sufficient to reform fluid flowing through said inlet conduit from substantially full conduit slug flow to channel flow in said inlet manifold;
an elongated closed liquid discharge manifold disposed spaced apart from said inlet manifold and below said inlet manifold in a working position of said system and having a liquid discharge conduit connected thereto;
a plurality of downcomer conduits interconnecting said inlet manifold with said discharge manifold, said downcomer conduits being connected to said inlet manifold along a lower portion of said inlet manifold forming said channel, said downcomer conduits being sufficient in number such that at a predetermined flow rate of fluid through said inlet manifold that substantially entirely liquid flow is conducted through a majority of said downcomer conduits and at least one of said downcomer conduits disposed in a direction downstream of others of said downcomer conduits with respect to the direction of flow of fluid through said inlet manifold receives less than entirely full liquid flow to permit gas to flow in a counterflow direction through said one downcomer conduit; and
a gas discharge conduit connected to said inlet manifold for conducting gas away from said inlet manifold which has separated from liquid flowing into said inlet manifold from said inlet conduit.

10. A system for separating fluid of one phase from fluid of another phase flowing through a closed inlet conduit, said system comprising: means for converting slug flow into channel flow in a closed system including,
an enclosed inlet manifold connected to said inlet conduit and having a cross-sectional flow area sufficient to provide a chamber having a gas flow space and a liquid flow space forming a substantially unobstructed channel, said chamber providing for reforming fluid flowing through said inlet conduit from substantially full conduit slug flow to channel flow in said inlet manifold;
a closed liquid discharge manifold having a liquid discharge conduit connected thereto;
a plurality of intermediate conduits interconnecting said inlet manifold with said discharge manifold, said intermediate conduits being connected to said inlet manifold along a lower portion of said inlet manifold forming said channel, said intermediate conduits being sufficient in number and being connected to said inlet manifold spaced apart from each other such that a predetermined flow rate of fluid through said inlet manifold substantially entirely liquid flow attaches to the lower wall of said chamber and enters at least some of said intermediate conduits, and at least one of said intermediate conduits is disposed in a direction downstream of others of said intermediate conduits with respect to the direction of flow of fluid through said inlet manifold and receives less than entirely full liquid flow to permit gas to flow in a counterflow direction through said one intermediate conduit; and
a gas discharge conduit connected to said inlet manifold for conducting gas away from said inlet manifold which has separated from liquid flowing into said inlet manifold from said inlet conduit.

* * * * *